(12) United States Patent
Kapoor et al.

(10) Patent No.: US 9,619,535 B1
(45) Date of Patent: Apr. 11, 2017

(54) USER DRIVEN WAREHOUSING

(71) Applicant: Numerify, Inc., Cupertino, CA (US)

(72) Inventors: Rahul Kapoor, Cupertino, CA (US);
Gaurav Rewari, Cupertino, CA (US);
Sadanand Sahasrabudhe, Rockville, MD (US)

(73) Assignee: Numerify, Inc., San Jose, CA (US)

( * ) Notice: Subject to any disclaimer, the term of this patent is extended or adjusted under 35 U.S.C. 154(b) by 306 days.

(21) Appl. No.: 14/279,090

(22) Filed: May 15, 2014

(51) Int. Cl.
*G06F 17/30* (2006.01)

(52) U.S. Cl.
CPC .............................. *G06F 17/30563* (2013.01)

(58) Field of Classification Search
CPC ................................................. G06F 17/30563
See application file for complete search history.

(56) References Cited

U.S. PATENT DOCUMENTS

| | | | | |
|---|---|---|---|---|
| 8,676,772 | B2* | 3/2014 | Gislason | G06F 17/30563 707/696 |
| 9,209,995 | B2* | 12/2015 | Ansari | G06Q 30/04 |
| 2002/0161778 | A1* | 10/2002 | Linstedt | G06Q 10/06 |
| 2005/0187991 | A1* | 8/2005 | Wilms | G06F 17/30563 |
| 2007/0027843 | A1* | 2/2007 | Auerbach | G06F 17/30563 |
| 2008/0027924 | A1* | 1/2008 | Hamilton | G06F 17/30867 |
| 2008/0250057 | A1* | 10/2008 | Rothstein | G06F 17/30286 |
| 2009/0138427 | A1* | 5/2009 | Kalavade | G06Q 10/0637 |
| 2009/0248729 | A1* | 10/2009 | Bruno, Jr. | G06F 17/30604 |
| 2011/0213756 | A1* | 9/2011 | Chen | G06F 17/30359 707/684 |
| 2012/0089562 | A1* | 4/2012 | Deremigio | G06F 17/30563 707/602 |
| 2013/0254156 | A1* | 9/2013 | Abbasi | G06F 17/30371 707/602 |
| 2013/0325788 | A1* | 12/2013 | Brown | G06F 17/30563 707/602 |
| 2014/0310231 | A1* | 10/2014 | Sampathkumaran | G06F 17/30563 707/602 |

* cited by examiner

*Primary Examiner* — Huawen A Peng
(74) *Attorney, Agent, or Firm* — Brokaw Patent Law PC; Christopher J. Brokaw

(57) ABSTRACT

Approaches for a user-driven warehousing approach are provided, wherein usage patterns for business intelligence applications are gathered, for example in an automated recording fashion, allowing the automated scheduling of jobs in a manner that prioritizes jobs that populate the most-used tables and scheduling those jobs in a manner to ensure that the data is up-to-date prior to when it is generally accessed. The usage pattern analysis also allows for the automated identification of more focused data marts for particular situations. The usage pattern analysis also provides for automated data warehouse/data mart creation and customization based on usage patterns that may be used as a seed, as well as for on-the-fly latitudinal analysis across prepackaged domain-specific applications.

24 Claims, 5 Drawing Sheets

USER DRIVEN WAREHOUSING

FIELD OF THE INVENTION

Embodiments of the invention relate to automatically tailoring generic domain specific data warehouses and/or data marts based on automated analysis of data usage patterns.

BACKGROUND

A data warehouse is a database used for generating reports and data analysis. To facilitate reporting and data analysis functions, data is often transformed and organized in star schemas within a data warehouse. Populating the data within the data warehouse is done via ETL (Extract, Transform, Load) operations, which requires that the data warehouse maintain, in addition to the current state of the data warehouse, information about the last incremental data extractions obtained from the source tables. ETL operations propagate incremental changes made at the source tables into the star schemas of the data warehouse. ETL operations may transform the data prior to loading the data into the data warehouse. Examples of such types of transformation include data cleansing, data standardization, surrogate key generation, surrogate key replacement, unit of measure conversion, and currency conversion.

In Business Intelligence ("BI") environments, custom data warehouse design, generation and population is often performed by specialist ETL developers and based on requirements manually gathered from potential warehouse users in a time-consuming fashion. The users describe the types of reports and dashboards needed for their use case(s), and the ETL developers take the information and perform their task, usually taking a long period of time.

Additionally, the process of creating the data warehouse model, deciding the frequency of ETL jobs, figuring out which warehouse data tables need to be kept in sync, maintenance, etc. is all performed manually. For one customer this is a laborious process, but for a Software as a Service ("SaaS") provider who intends to service numerous customers for example via automated processes, this individual process is neither cost- nor time-effective.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
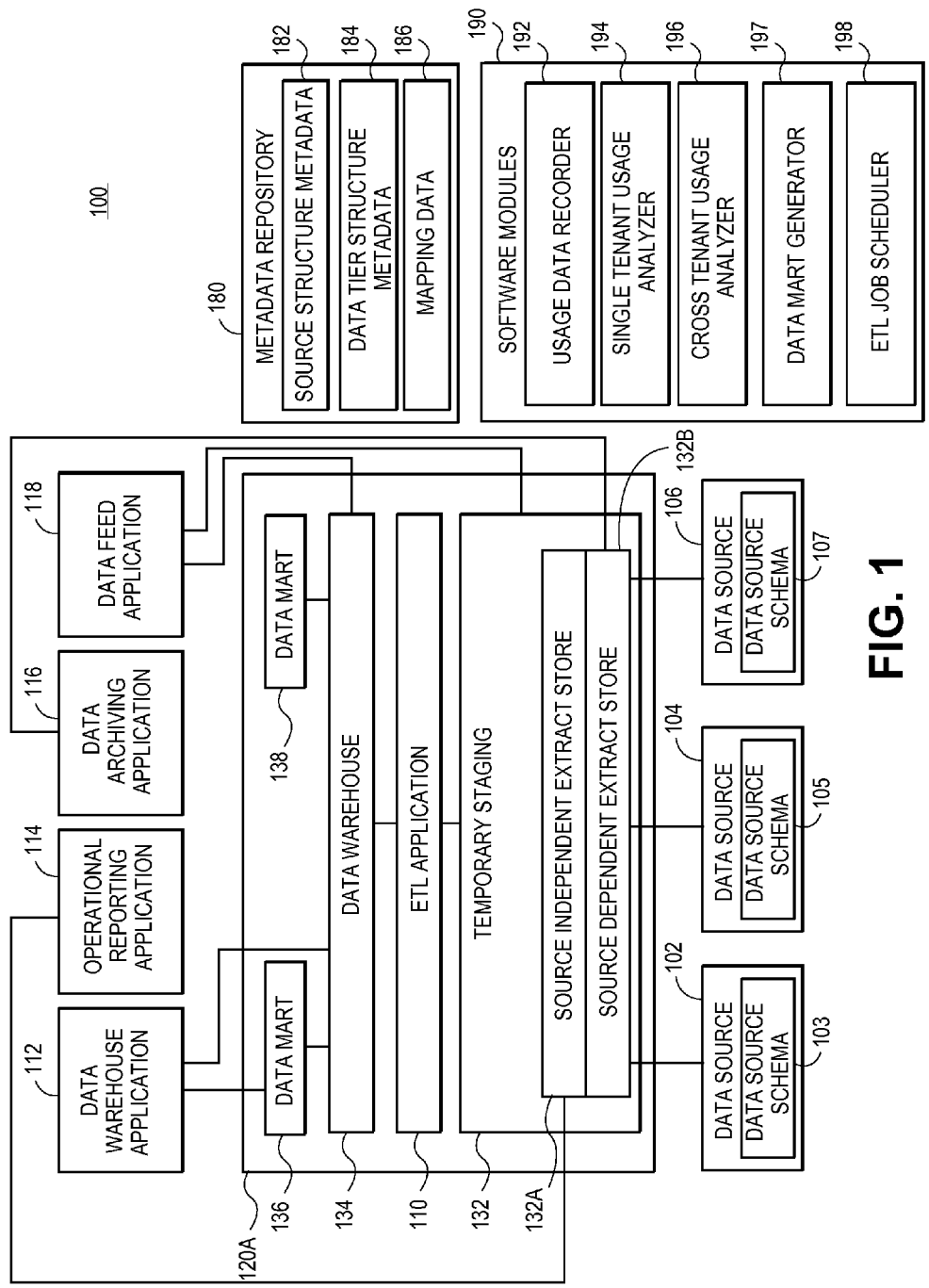
FIG. 1 is a block diagram of the components of a first exemplary data management system according to one embodiment of the invention.

Various approaches are provided for providing techniques for automatically tailoring generic domain specific data warehouses and/or data marts based on automated analysis of data usage patterns. The approaches described herein allow for techniques such as the generation and adaptation of data warehouses and/or data marts based on BI user needs and usage patterns in an automated fashion. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Traditionally, data warehouse/data mart design, creation, generation and population has been manually performed by professionally trained ETL developers on a one-at-a-time basis. Due to inefficiencies of scale with this process, it becomes advantageous to provide an automated process that utilizes an analysis of individual customer usage patterns to automatically generate generic domain-specific data warehouses and/or data marts based on individual customer's data usage patterns.

In an embodiment, usage patterns for other users (e.g., other customers) are gathered, for example in an automated recording fashion, which illustrates which of the data warehouse/data mart tables are important and their access patterns. This data allows the automated scheduling of jobs in a manner that prioritizes jobs that populate the most-used tables and scheduling those jobs in a manner to ensure that the data is up-to-date prior to when it is generally accessed.

In an embodiment, the analysis of usage patterns allows for the automated identification of more focused data marts for particular situations. This usage-based analysis provides the ability to automatically recommend, create, and populate data marts for the most-used or most-accessed data for a particular group of users.

In an embodiment, prior efforts at data gathering and analysis related to automated data warehouse/data mart creation and customization based on usage patterns may be used as a seed for future efforts. For example, based on an understanding of the new customer, the data warehouse/data mart customizations previously generated for customers similarly situated to the new customer may be leveraged to automatically create data warehouses/data marts, job prioritizations, and commonly-used reports and/or dashboards for the new customer.

In an embodiment, techniques are provided for on-the-fly latitudinal analysis across prepackaged domain-specific applications. This is performed in one example by automatically generating a cross-warehouse data mart along with associated ETL jobs. In another example, the synchronized loading of relevant data in different existing data warehouses and/or data marts provides for an efficient approach to perform ad-hoc analysis of data.

Architecture Overview

Embodiments of the invention advantageously provide for automatically tailoring generic domain specific data warehouses and/or data marts based on automated analysis of data usage patterns. FIG. 1 is a block diagram of the components of a data management system 100 according to one embodiment of the invention. System 100 includes data sources 102, 104, and 106, data tier 120A, one or more data management applications 112, 114, 116, and 118, metadata repository 180, and software modules 190. In an embodiment, multiple systems 100 are envisioned, from which data is gathered on usage patterns, as described more fully herein. The multiple systems 100 may, individually or as a group, contain a different combination of modules and elements described below, such as combining multiple modules into a single module, eliminating certain modules, or adding additional components and/or modules that may provide additional functionality as known in the art. The multiple systems 100 may be communicatively connected, either fully or in any combination of individual systems or modules.

Data sources 102, 104, and 106 are broadly meant to depict any source from which data may be obtained. In practice, one or more of data sources 102, 104, and 106 may correspond to business application sources like SalesForce, NetSuite, ServiceNow, Marketo, or Eloqua; data may be extracted from such business application sources using the API's provided thereby, as well as other information being communicated via the API's, as discussed herein. One or more of data sources 102, 104, and 106 may also correspond to public or government databases; for example, such databases may store information about weather, currency exchange rates, public government records, and the like. While only three data sources are depicted in FIG. 1; embodiments of the invention may be used with any number of data sources. Data source 102, 104, 106 each may persist data using data source schema 103, 105, 107 respectively. Note that each company or organization storing data in or retrieving data from a data source (such as data source 102, 104, and 106) may wish, at any time and at multiple occasions, to customize the source data schema employed by the data source.

The data tier, as broadly used herein, refers to any computerized approach for storing data which may be accessed by a data management application, such as, for example, data management applications 112, 114, 116, and 118. A particular example of a data tier is depicted in FIG. 1 and identified as data tier 120A. As shown in FIG. 1, data tier 120A may comprise a temporary staging area 132, an ETL application 110, a data warehouse 134, and one or more data marts 136, 138.

Temporary staging area 132 broadly refers to any mechanism for temporarily storing data retrieved from data sources 102, 104, and 106 to facilitate its use by data management applications 112, 114, 116, and 118. Once data is populated in temporary staging area 132, the data may be formatted or processed prior to loading the data into data warehouse 134. For example, in data tier 120A depicted in FIG. 1, temporary staging area 132 comprises a Source Independent Extract Store 132A and a Source Dependent Extract Store 132B. In this example, data that is retrieved from a data source may be stored directly into Source Dependent Extract Store 132B. Thereafter, the data may be modified to transform the data into a source independent format and moved to Source Independent Extract Store 132A. As implied by the name, once data has been moved from temporary staging area 132 to data warehouse 134, the data may be removed from temporary staging area 132.

ETL application 110, as broadly used herein, refers to one or more applications for extracting data from temporary staging 132, potentially performing one or more data transformations on the extracted data, and loading the transformed data into data warehouse 134. ETL application 110 may retrieve an initial extract of data from temporary staging 132 and thereafter retrieve incremental extracts corresponding to the changes made at a data source since the data was last retrieved therefrom. Prior to loading the extracted data into data warehouse 134, ETL application 110 may perform a variety of data transformations on the extracted data, such as but not limited to archival processes, CDC (change data capture) processes, source dependent to source independent processes, delta propagation processes, surrogate key generation processes, and surrogate key replacement processes. Processes for performing data transformations are well understood to those skilled in the art and will not be expounded upon herein.

Data warehouse 134, as used herein, refers to a database for reporting and data analysis. Data stored by data warehouse 134 may be obtained from a plurality of sources, namely data sources 102, 104, 106. Data warehouse 134 may store current and historical data and may be accessed by one or more of data management applications 112, 114, 116, and 118.

Data marts 136, 138, as used herein, each correspond to a subset of the data stored in data warehouse 134. The data stored within data marts 136, 138 typically serves a particular focus; for example, a particular data mart might serve a specific business line or team. While only two data marts, namely data marts 136, 138, are depicted in FIG. 1 for clarity, embodiments of the invention may employ any number of data marts, including no data marts, one data marts, or three or more data marts.

Data management applications 112, 114, 116, and 118 may access either data marts 136 and 138, data warehouse 134, and/or from temporary staging area 132, depending upon the needs of a particular implementation. For example, FIG. 1 depicts data warehouse application 112 accessing data stored in data mart 136, operational reporting application 114 accessing data stored in Source Independent Extract Store 132A, and data archiving application 116 accessing data from Source Dependent Extract Store 132B. Of course, these are but a few examples, as other implementations may confirm a data management application to access, read, or store data differently, e.g., FIG. 1 also depicts data warehouse application 112 having the capability of accessing data from data warehouse 134.

While FIG. 1 depicts a way to implement a data tier, embodiments of the invention may persist data in a data tier in many different ways; consequently, embodiments of the invention do not rely upon any particular mechanism for implementing a data tier. Embodiments of the invention may operate with any implementation of a data tier so long as the data tier is capable of persisting data in one or more data tier schemas. As used herein, the term "data tier schema" refers to a schema used to persistently store data in the data tier. A data tier schema may be used in data warehouse 134, data mart 136, data mart 138, Source Independent Extract Store 132A, or Source Dependent Extract Store 132B, for example.

Data warehouse application 112, operational reporting application 114, data archiving application 116, and data feed application 118, as broadly used herein, refer to applications or services which may issue queries for data to the data tier and, in turn, use the data retrieved from the data tier in disparate ways. While system 100 depicts the inclusion of data warehouse application 112, operational reporting application 114, data archiving application 116, and data feed application 118, the presence of these applications is optional, as a particular implementation of system 100 need not include each of applications 112-118. Therefore, system 100 may include any combination of applications 112-118.

Metadata repository 180, as broadly used herein, refers to any mechanism for storing metadata. The metadata stored in metadata repository 180 describes the customizations performed by a customer throughout system 100. This metadata may be used to describe how data is stored at a data source or at data tier 120A as well as provide insight into how data originating at a data source is used by all aspects of system 100. Further, this metadata may be used to customize the operation of software modules 190.

Different types of metadata may be stored in metadata repository 180. To illustrate, metadata repository, in an embodiment, may store source structure metadata 182, data tier structure metadata 184, and mapping data 186, although it should be clear that the types of metadata stored in metadata repository 180 are not limited to these examples. Source structure metadata 182 describes the structure, characteristics, and configurations of a data source (including the source data schemas), data tier structure metadata 184 describes the structure, characteristics, and configurations of aspects of the data tier (including data tier schemas), and mapping data 186 describes a mapping or relationship between attributes of source data schemas to attributes of data tier schemas. In this way, the metadata stored by metadata repository 180 may be used to view how data flows through system 100 and how a change to an aspect of one type of data affects other portions of system 100. The use of metadata stored by metadata repository 180 in one embodiment shall be described in more detail in the next section.

Software modules 190 refers to a set of software processes or modules which are responsible for, in one example, performing automated functions based on the metadata stored in metadata repository 180, e.g., software modules 190 support aspects of the various user driven warehousing techniques described herein. Generally, software modules 190 are dynamically composed in executable form based on the metadata stored in metadata repository 180.

Usage data recorder module 192, as broadly used herein, refers to one or more processes for recording usage data as more fully described herein. In one example, usage data recorder module 192 is responsible for monitoring and recording usage data about access patterns for data tables, including when they are accessed, which tables are accessed and the frequency of each table being accessed, and other data particular to the usage of the one or more systems 100.

Single tenant usage analyzer 194, as broadly used herein, refers to one or more processes for receiving and analyzing data describing usage data related to a single tenant. In an embodiment, this analysis is then used as a seed for automated creation of a new system 100 for a new tenant.

Cross tenant usage analyzer 196, as broadly used herein, refers to one or more processes for receiving and analyzing data describing usage data related to multiple tenants. In an embodiment, this analysis is then used as a seed for automated creation of a new system 100 for a new tenant.

Data mart generator 197, as broadly used herein, refers to one or more processes for automatically creating a new data mart that in one embodiment may provide access to subsets of a larger data set in various ways that speed the access of the data, such as an in-memory machine or a private smaller warehouse closer to the entity accessing the data, for example based on usage data.

ETL job scheduler 198, as broadly used herein, refers to one or more processes for automatically scheduling ETL jobs, in one example to populate data tables in a prioritized and scheduled manner that ensures that the data tables in questions have the most current data possible before the time they are typically accessed.

Having provided a description of the components of system 100, additional details of automatically tailoring generic domain specific data warehouses and/or data marts based on automated analysis of data usage patterns according to an embodiment of the invention are presented below.

User Driven Warehousing

Businesses that take advantage of data warehousing and ETL techniques usually have different usage patterns for the data contained therein. Each data warehouse/data mart solution has been specifically created and customized for each customer, usually by expensive consultants who can only work on one job at a time. With the rise of cloud computing and SaaS services, service providers wish to offer prepackaged BI applications in different domains (e.g., Marketing, Sales, Finance, IT, etc.), with data extracted from various cloud sources, supporting back-end data warehouses/data marts, and scheduling ETL jobs to populate them with data. It would be advantageous to provide for servicing many different customers without having to develop custom warehouses for each customer.

In an embodiment, customer usage patterns are automatically tracked as they use various BI applications and access data tables from the data warehouses/data marts. The access patterns for the data tables include when they are accessed, which tables are accessed and the frequency of each table being accessed, and other data particular to the usage of the system as described above. Based on the data automatically gathered as part of the tracking process, jobs that populate the most-used tables may be prioritized and scheduled in a manner that ensures that the data tables in questions have the most current data possible before the time they are typically accessed.

In an embodiment, the tracking data is stored and accessed in metadata form, which may take any number of formats known in the art. As part of the techniques, the metadata stores relationships between end-user visible BI objects such as reports and dashboards, their constituent queries, and the set of tables they reference. By tracking and analyzing this usage data, statistics on the underlying data warehouse/data mart table sets may be determined.

Data such as frequency of usage is then analyzed to determine priority statistics for particular data sets and/or tables, and clustering by time periods allows the determination of scheduling data. In one example, the frequency of usage is determined by analyzing which queries and reports are run, when they are run, and how frequently they are run, along with data relating to the accessing of the warehouse tables that are most important to the usage. Frequency of usage provides insight into the priority of different data tables. This data allows for the automatic computation of job scheduling and prioritization that will, in one aspect, provide for the most current data in the tables required for particular jobs. This usage may be tracked over time and a standard clustering algorithm known in the art may be run to cluster usage by time periods which will provide input on when particular tables need to be refreshed with current data.

Minimum and maximum refresh times, which may be user-configurable, provide a basis for walking clustered usage results, in one example by decreasing frequency, which allows suggested schedules to be determined for populating particular data warehouses/data marts/data tables with up-to-date data prior to jobs being executed that need the data, according to the automated predictions generated by the above approach. Manual overrides and scheduling may be provided in order to customize the automated recommendations.

By applying automatically-gathered usage statistics within the context of scheduling and prioritizing ETL jobs, fresh data may be made available for various BI processes without human intervention. For example, a customer may run a particular BI report at 8 AM every morning, which accesses three particular data tables. The approaches described herein allow for the automated scheduling of jobs which refresh the data tables in question with the most current data prior to 8 AM, including taking the time to perform the job which retrieves the data. If the job requires one hour, then the job is scheduled for approximately 7 AM.

As part of the approaches describes herein, it may be advantageous to provide for automated data mart generation. Generic domain-specific data warehouse models are generally quite large with elaborate dimensional models that hold enormous amounts of data, and accessing data from them requires large amounts of resources (e.g., time, bandwidth, processing). Not all users of a BI system need to access all of the data all of the time.

By recording and analyzing usage patterns of different groups and/or users of BI systems, along with storing the underlying data model in metadata for automated access, smaller data marts may be automatically designed, generated, and populated with specific data tables relevant to the specific needs of the groups and/or users, although it should be understood that a group may map to different departments and/or organizations within an entity). These data marts may provide access to subsets of the larger data set in various ways that speed the access of the data, such as an in-memory machine or a private smaller warehouse closer to the entity accessing the data.

In an example, a generic data warehouse is provided that has been defined as part of an application domain and BI process to work with any entity; generally, a warehouse that should meet a customer's requirements. By monitoring and analyzing the usage patterns of various groups and/or users of the data warehouse and BI tools, along with analyzing the underlying dimensional model of the data, smaller data marts may be automatically provisioned for each such group or user.

As an example, if an application comprises five independent star schemas and a particular group only uses two, the techniques described herein would analyze the usage along with the underlying dimensional model to suggest a data mart with only those two star schemas, which data mart would then be automatically generated along with all related jobs to populate, prioritize, and provide access to the data mart. The partitioning of the data may be performed in a way to ensure functional completeness (i.e., all functional dependencies are maintained) along with adhering to any rules and/or restrictions mandated by application developers regarding partitioning. Therefore, if the two star schemas refer to a common dimension shared between the five star schemas, that would be included in the automatically-generated data mart. Support may be provided for manual review and refinement of any suggested data marts prior to their creation and incorporation.

As an example, by leveraging an understanding of different groups and/or users in a particular entity, gained by automatically recording and analyzing usage patterns, along with an understanding of the underlying dimensional data model stored in metadata, we can determine that the marketing group in a company typically prefer certain data tables in the warehouse. A data mart containing those particular data tables is automatically provisioned and made accessible to the marketing group, and all underlying configuration to migrate the users in that group from accessing the data warehouse to accessing the data mart is automatically performed, along with any ETL jobs necessary to populate the newly-created data mart with fresh data at a time most relevant to the group's underlying use.

As discussed above with respect to FIG. 1, there may be multiple systems 100 in operation; for example, multiple departments in a single entity or multiple separate entities. The data gathering and analysis approaches described herein may be applied across multiple systems and used to make automated or manual recommendations regarding job scheduling, job prioritization, data mart creation, and other tasks as discussed herein. Additionally, the usage data gathered across domains and entities may be used to recommend various BI reports and/or dashboards.

In an example, upon receiving a request to perform certain tasks for a new tenant (e.g., job scheduling, job prioritization, data mart creation, etc.), data regarding a current tenant's usage patterns and other descriptive data may be used as a seed for the new tenant. One example is taking the data mart and/or job scheduling and prioritization model of the closest prior tenant, along with their commonly used reports and/or dashboards, and basing the creation of the new tenant's system on the usage data of the closest prior tenant. Additionally, as actual usage data is gathered and analyzed for the new tenant, modifications to the new tenant's system may be automatically applied; for example, the data mart may be modified to drop or include additional tables, the job scheduling may be modified, certain reports may be modified, etc.

In an embodiment, the techniques described herein provide on-the-fly latitudinal analysis going across domain-specific applications, some of which may be predefined. Latitudinal analysis in this context means across different domains. As an example, a user may desire to analyze the impact of a marketing campaign on sales, as well as calculating the incremental revenue and profits from the campaign. This example of latitudinal analysis encompasses three different domains: sales, marketing, and finance. Each domain may have different ETL specifics, such as data warehouses, data marts, jobs, reports, etc. By leveraging data describing the dimensional models for all the different domains, latitudinal analysis may be performed as described herein.

In an example, linkages in the data model are created, maintained and monitored. If the model tracks sales that resulted from a marketing campaign, along with revenue from each sale, along with the marketing campaign expenses, the incremental revenue and profits attributable to the marketing campaign may be calculated.

In the event sales that resulted from a marketing campaign are not directly tracked, then data describing particular geographies impacted by the marketing campaign, along with the campaign duration in those geographies, may be analyzed. Using the common dimensions of time and geography, sales potentially influenced by the marketing campaign may be identified by cross-warehouse queries utilizing the linkages, in one example leveraging correlation techniques along with information on historical sales in the same geography and time period, if available.

An embodiment combines the automated creation of one or more data marts including relevant parts of the dimensional model for the marketing, sales, and finance analytics along with the creation of jobs to populate the data mart and run in a synchronized fashion so that the data in the data mart is consistent across all affected domains. By pulling relevant data for the tables in the custom data mart in synchronous fashion, repeated analytics on the data may be supported. For one-time ad hoc style analysis, creation of dedicated data marts for latitudinal analysis isn't needed and queries can go against existing warehouses and the relevant data for the latitudinal analytics query may be extracted and loaded in a synchronized manner across the warehouses so that the results of any latitudinal analysis remain valid and consistent.

Figure 2:
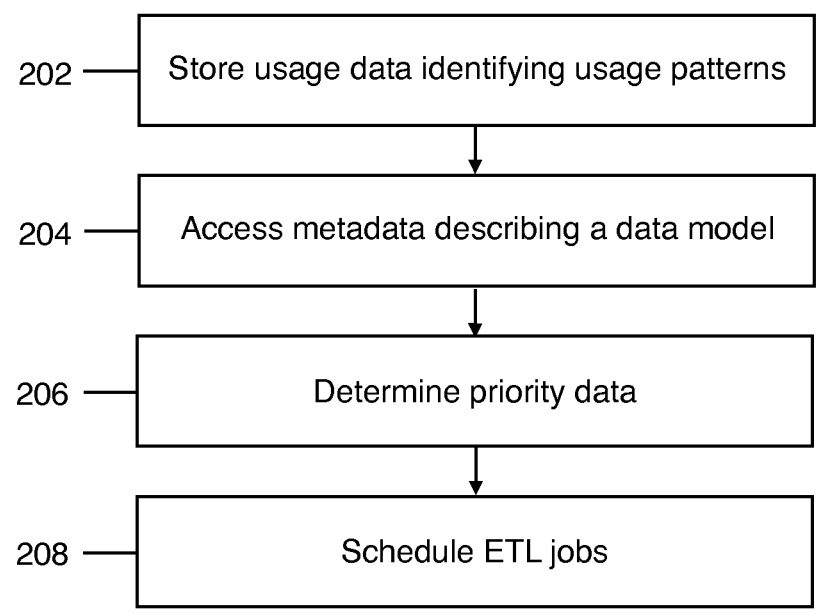
FIG. 2 is a flowchart illustrating example steps for providing a user driven warehousing approach according to an embodiment of the invention.

FIG. 2 is a flowchart 200 illustrating example steps for automatically tailoring generic domain specific data warehouses and/or data marts based on automated analysis of data usage patterns, according to an embodiment of the invention. In some implementations, the approaches described by the figures can include fewer, additional and/or different operations. Additionally, only one or some subset of these operations may be included, as each operation may stand alone, or may be provided in some different order other than that shown in FIG. 2 and the other figures described herein.

At 202, usage data is stored that identifies usage patterns of business intelligence applications. In an embodiment, the BI applications access data tables, and the usage data describes which reports and dashboards are being accessed along with the time and frequency of the accessing.

At 204, metadata describing the data model of the data tables is accessed. In an embodiment, this metadata may describe relationships between business intelligence application reports, data queries used by the reports, and the set of data tables referenced by the queries. In an embodiment, metadata is accessed to translate usage data on end user visible objects like reports to data tables.

At 206, a priority for the data tables is determined, wherein the priority is based on the frequency of usage over a predetermined period of time. In an embodiment, a schedule and/or priority for the ETL jobs is determined so that the affected data tables are updated at a particular point in time, resulting in the freshest-possible data being available to queries pursuant to the usage data. In an embodiment, the particular point in time may correspond to a preferred point in time as established by the usage patterns, which means an optimal time where the most-current data possible is made available.

At 208, ETL jobs related to the data tables are automatically scheduled based on the priority and clustering of usage by time period. In an embodiment, refresh data comprising minimum and maximum refresh parameters is received that may be used to modify the schedule for the ETL jobs so that they do not run fewer times than the minimum and/or more times than the maximum, as well as not running outside particular times. In another embodiment, a request for an override of the automatically-created ETL job schedule may be received, and in response, the schedule for the ETL jobs is modified based on the override request, for example from a user who wants the ETL job to run immediately rather than in the future.

Figure 3:
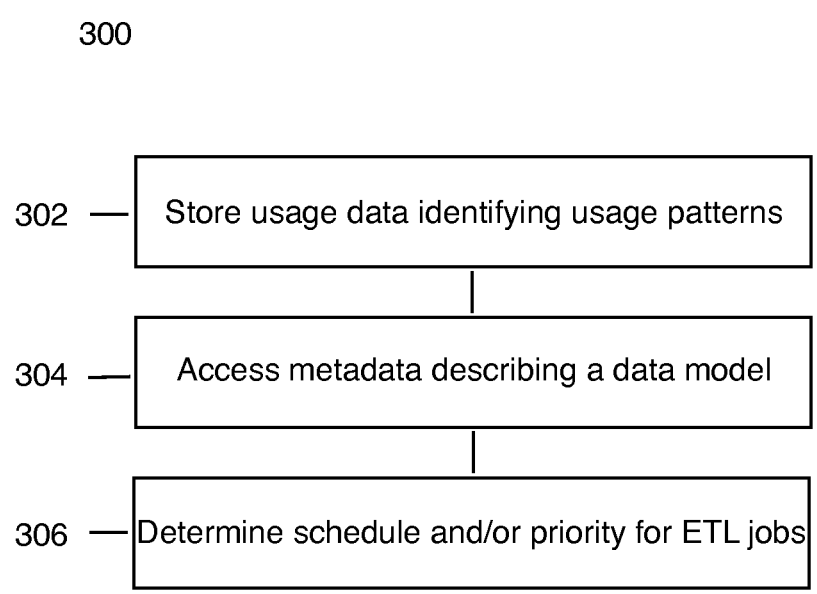
FIG. 3 is a flowchart illustrating example steps for providing a user driven warehousing approach according to an embodiment of the invention.

FIG. 3 is a flowchart 300 illustrating example steps for automatically tailoring generic domain specific data warehouses and/or data marts based on automated analysis of data usage patterns, according to an embodiment of the invention.

At 302, usage data is stored that identifies usage patterns of business intelligence applications. In an embodiment, the BI applications access data tables, and the usage data describes which reports and dashboards are being accessed along with the time and frequency of the accessing.

At 304, metadata describing the data model of the data tables is accessed. In an embodiment, this metadata may describe relationships between business intelligence application reports, data queries used by the reports, and the set of data tables referenced by the queries.

At 306, one or more data marts may be automatically created based on the usage data, wherein the data mart(s) comprises a subset of data tables stored in a data warehouse. Access to the data mart may then be automatically provided independent of manual configuration; for example, any queries may be automatically redirected from their original source (e.g., a data warehouse) to the new data mart(s). This may also include identifying functional dependencies between the business intelligence applications and original source data, and automatically preserving those functional dependencies between the business intelligence applications and the new data mart(s).

Figure 4:
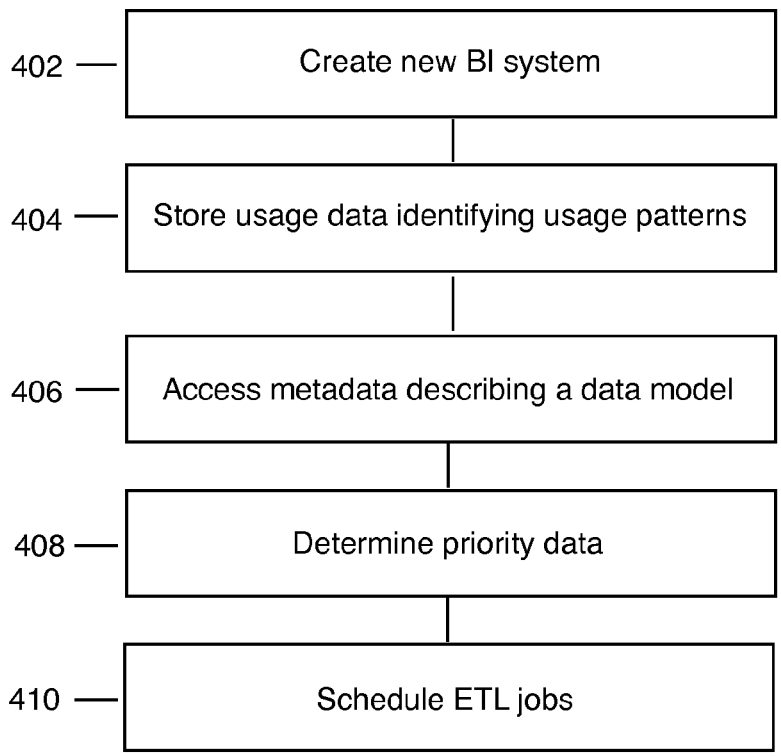
FIG. 4 is a flowchart illustrating example steps for providing a user driven warehousing approach according to an embodiment of the invention.

FIG. 4 is a flowchart 400 illustrating example steps for automatically tailoring generic domain specific data warehouses and/or data marts based on automated analysis of data usage patterns, according to an embodiment of the invention.

At 402, a new BI system, for example for a new customer, is created, such as the one described with respect to system 100 of FIG. 1, although embodiments are envisioned wherein a subset of the entirety of system 100 are created. The new system may comprise business intelligence applications, business intelligence reports, ETL jobs, and/or a data warehouse. The stored usage data from a previously-created business intelligence system (e.g., from one or more previous customers) is used as a "seed," or template, for the new business intelligence system, which is created and configured based on the stored usage data for previous customers. In an embodiment, as the new system is used, new usage data on the new business intelligence system is gathered over a period of time; and used to modify the new business intelligence system based on the new usage data.

At 404, usage data is stored that identifies usage patterns of business intelligence applications. In an embodiment, the BI applications access data tables, and the usage data describes which reports and dashboards are being accessed along with the time and frequency of the accessing.

At 406, metadata describing the data model of the data tables is accessed. In an embodiment, this metadata may describe relationships between business intelligence application reports, data queries used by the reports, and the set of data tables referenced by the queries.

At 408, a priority for the data tables is determined, wherein the priority is based on the frequency of usage over a predetermined period of time. In an embodiment, a schedule and/or priority for the ETL jobs is determined so that the affected data tables are updated at a particular point in time, resulting in the freshest-possible data being available to queries pursuant to the usage data. In an embodiment, the particular point in time may correspond to a preferred point in time as established by the usage patterns, which means an optimal time where the most-current data possible is made available.

At 410, ETL jobs related to the data tables are automatically scheduled based on the priority and clustering of usage by time period. In an embodiment, refresh data comprising minimum and maximum refresh parameters is received that may be used to modify the schedule for the ETL jobs so that they do not run fewer times than the minimum and/or more times than the maximum, as well as not running outside particular times. In another embodiment, a request for an override of the automatically-created ETL job schedule may be received, and in response, the schedule for the ETL jobs is modified based on the override request, for example from a user who wants the ETL job to run immediately rather than in the future.

Figure 5:
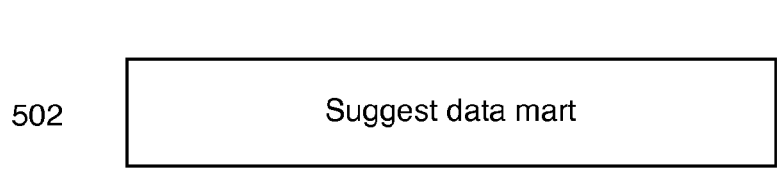
FIG. 5 is a flowchart illustrating example steps for providing a user driven warehousing approach according to an embodiment of the invention.

FIG. 5 is a flowchart 500 illustrating example steps for automatically tailoring generic domain specific data warehouses and/or data marts based on automated analysis of data usage patterns, according to an embodiment of the invention At 502, a request for latitudinal analysis is received, and a data mart (or multiple data marts) is created that is comprised of data tables from one or more data warehouses, for example across domains. The data mart is then populated via automatically-created ETL jobs. In another embodiment, a request for non-recurring latitudinal analysis request is received, leading to synchronized job scheduling for the ad-hoc analysis request.

Hardware Mechanisms

Figure 6:
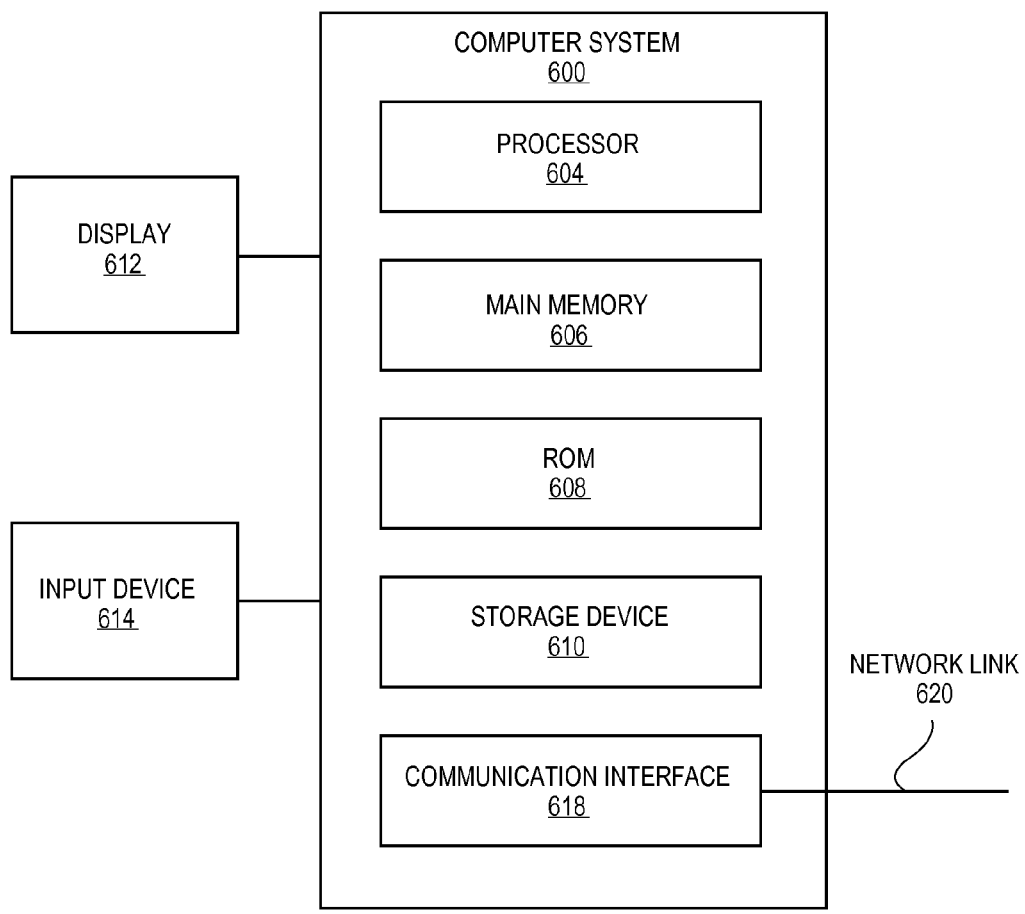
FIG. 6 is a block diagram that illustrates a computer system upon which an embodiment of the invention may be implemented.

In an embodiment, each of the software components depicted in FIG. 1 may be implemented on one or more computer systems. FIG. 6 is a block diagram that illustrates a computer system 600 upon which an embodiment of the invention may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 6, embodiments of the invention may include any number of input devices 614 coupled to computer system 600.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

What is claimed is:

1. A non-transitory computer-readable storage medium storing one or more sequences of instructions for user driven warehousing, which when executed by one or more processors, causes:

storing usage data identifying usage patterns of business intelligence applications, wherein the business intelligence applications access data tables, and wherein the usage data describes which data tables are being accessed along with the time and frequency of the accessing;

accessing metadata describing the data model of the business intelligence applications;

determining a refresh priority for the data tables, wherein the refresh priority is based on usage patterns of the data tables over a predetermined period of time; and automatically scheduling Extract, Transform, Load (ETL) jobs related to the data tables based on the refresh priority and clustering of the usage of tables by time to ensure that the data tables are refreshed before a time of their anticipated use.

2. The non-transitory computer-readable storage medium of claim 1, wherein execution of the one or more sequences of instructions further comprises:

accessing metadata describing relationships between business intelligence application reports, data queries used by the reports, and the set of data tables referenced by the queries to translate usage data on reports to usage data on data tables.

3. The non-transitory computer-readable storage medium of claim 1, wherein execution of the one or more sequences of instructions for automatically scheduling ETL jobs further comprises:

automatically creating a data mart based on the usage data, wherein the data mart comprises a subset of data tables stored in a data warehouse; and automatically providing access to the data mart, wherein the access is provided independent of manual configuration.

4. The non-transitory computer-readable storage medium of claim 3, wherein execution of the one or more sequences of instructions further comprises:

identifying functional dependencies between the business intelligence applications and the data tables stored in a data warehouse; and preserving the functional dependencies between the business intelligence applications and data tables in the newly created data mart.

5. The non-transitory computer-readable storage medium of claim 1, wherein execution of the one or more sequences of instructions further comprises:

receiving a request to create a new business intelligence system, wherein the new system comprises business intelligence applications, business intelligence reports, ETL jobs, and a data warehouse;

analyzing the stored usage data to determine a previously-created business intelligence system to use as a template for the new business intelligence system;

creating the new business intelligence system; and automatically configuring the new business intelligence system based on the stored usage data.

6. The non-transitory computer-readable storage medium of claim 5, wherein execution of the one or more sequences of instructions further comprises:

gathering new usage data on the new business intelligence system over a period of time; and modifying the new business intelligence system based on the new usage data, wherein the modifying includes creating data marts and scheduling ETL jobs operable to provide data to the data marts.

7. The non-transitory computer-readable storage medium of claim 1, wherein execution of the one or more sequences of instructions further comprises:
   receiving a request for latitudinal analysis;
   automatically creating a data mart based on the request, wherein the data mart comprises data tables from a plurality of data warehouses;
   analyzing the metadata describing the data model of the data tables from the plurality of data warehouses; and
   automatically creating ETL jobs to populate the data mart.

8. The non-transitory computer-readable storage medium of claim 1, wherein execution of the one or more sequences of instructions further comprises:
   receiving a request for ad-hoc latitudinal analysis;
   analyzing the metadata describing the data model of the data tables from the plurality of data warehouses;
   automatically creating ETL jobs to load a subset of the data tables from the plurality of data warehouses; and
   synchronizing the ETL jobs such that the data tables are loaded by a preferred point in time to ensure consistent results for the ad-hoc latitudinal analysis.

9. An apparatus for user driven warehousing, comprising:
   one or more processors; and
   one or more non-transitory computer-readable storage mediums storing one or more sequences of instructions, which when executed by the one or more processors, cause:
      storing usage data identifying usage patterns of business intelligence applications, wherein the business intelligence applications access data tables, and wherein the usage data describes which data tables are being accessed along with the time and frequency of the accessing;
      accessing metadata describing the data model of the business intelligence applications;
      determining a refresh priority for the data tables, wherein the refresh priority is based on the usage patterns of the data tables over a predetermined period of time; and
      automatically scheduling Extract, Transform, Load (ETL) jobs related to the data tables based on the refresh priority and clustering of the usage of tables by time to ensure that the data tables are refreshed before a time of their anticipated use.

10. The apparatus of claim 9, wherein execution of the one or more sequences of instructions further causes:
   accessing metadata describing relationships between business intelligence application reports, data queries used by the reports, and the set of data tables referenced by the queries to translate usage data on reports to usage data on data tables.

11. The apparatus of claim 9, wherein execution of the one or more sequences of instructions for automatically scheduling ETL jobs further comprises:
   automatically creating a data mart based on the usage data, wherein the data mart comprises a subset of data tables stored in a data warehouse; and
   automatically providing access to the data mart, wherein the access is provided independent of manual configuration.

12. The apparatus of claim 11, wherein execution of the one or more sequences of instructions further causes:
   identifying functional dependencies between the business intelligence applications and the data tables stored in a data warehouse; and
   preserving the functional dependencies between the business intelligence applications and data tables in the newly created data mart.

13. The apparatus of claim 9, wherein execution of the one or more sequences of instructions further causes:
   receiving a request to create a new business intelligence system, wherein the new system comprises business intelligence applications, business intelligence reports, ETL jobs, and a data warehouse;
   analyzing the stored usage data to determine a previously-created business intelligence system to use as a template for the new business intelligence system;
   creating the new business intelligence system; and
   automatically configuring the new business intelligence system based on the stored usage data.

14. The apparatus of claim 13, wherein execution of the one or more sequences of instructions further causes:
   gathering new usage data on the new business intelligence system over a period of time; and
   modifying the new business intelligence system based on the new usage data, wherein the modifying includes creating data marts and scheduling ETL jobs operable to provide data to the data marts.

15. The apparatus of claim 9, wherein execution of the one or more sequences of instructions further causes:
   receiving a request for latitudinal analysis;
   automatically creating a data mart based on the request, wherein the data mart comprises data tables from a plurality of data warehouses;
   analyzing the metadata describing the data model of the data tables from the plurality of data warehouses; and
   automatically creating ETL jobs to populate the data mart.

16. The apparatus of claim 9, wherein execution of the one or more sequences of instructions further causes:
   receiving a request for ad-hoc latitudinal analysis;
   analyzing the metadata describing the data model of the data tables from the plurality of data warehouses;
   automatically creating ETL jobs to load a subset of the data tables from the plurality of data warehouses; and
   synchronizing the ETL jobs such that the data tables are loaded by a preferred point in time to ensure consistent results for the ad-hoc latitudinal analysis.

17. A method for user driven warehousing, comprising:
   storing usage data identifying usage patterns of business intelligence applications, wherein the business intelligence applications access data tables, and wherein the usage data describes which data tables are being accessed along with the time and frequency of the accessing;
   accessing metadata describing the data model of the business intelligence applications;
   determining a refresh priority for the data tables, wherein the priority is based on usage patterns of the data tables over a predetermined period of time; and
   automatically scheduling Extract, Transform, Load (ETL) jobs related to the data tables based on the refresh priority and clustering of the usage of tables by time to ensure that the data tables are refreshed before a time of their anticipated use.

18. The method of claim 17, further comprising: accessing metadata describing relationships between business intelligence application reports, data queries used by the reports, and the set of data tables referenced by the queries to translate usage data on reports to usage data on data tables.

19. The method of claim 17, wherein automatically scheduling ETL jobs further comprises:

automatically creating a data mart based on the usage data, wherein the data mart comprises a subset of data tables stored in a data warehouse; and automatically providing access to the data mart, wherein the access is provided independent of manual configuration.

20. The method of claim 19, further comprising:

identifying functional dependencies between the business intelligence applications and the data tables stored in a data warehouse; and preserving the functional dependencies between the business intelligence applications and data tables in the newly created data mart.

21. The method of claim 17, further comprising:

receiving a request to create a new business intelligence system, wherein the new system comprises business intelligence applications, business intelligence reports, ETL jobs, and a data warehouse;

analyzing the stored usage data to determine a previously-created business intelligence system to use as a template for the new business intelligence system;

creating the new business intelligence system; and automatically configuring the new business intelligence system based on the stored usage data.

22. The method of claim 21, further comprising:

gathering new usage data on the new business intelligence system over a period of time; and modifying the new business intelligence system based on the new usage data, wherein the modifying includes creating data marts and scheduling ETL jobs operable to provide data to the data marts.

23. The method of claim 17, further comprising:

receiving a request for latitudinal analysis;

automatically creating a data mart based on the request, wherein the data mart comprises data tables from a plurality of data warehouses;

analyzing the metadata describing the data model of the data tables from the plurality of data warehouses; and automatically creating ETL jobs to populate the data mart.

24. The method of claim 17, further comprising:

receiving a request for ad-hoc latitudinal analysis;

analyzing the metadata describing the data model of the data tables from the plurality of data warehouses;

automatically creating ETL jobs to load a subset of the data tables from the plurality of data warehouses; and synchronizing the ETL jobs such that the data tables are loaded by a preferred point in time to ensure consistent results for the ad-hoc latitudinal analysis.

* * * * *